US011525978B2

(12) United States Patent
Kubo

(10) Patent No.: US 11,525,978 B2
(45) Date of Patent: Dec. 13, 2022

(54) VARIABLE FOCAL LENGTH LENS APPARATUS

(71) Applicant: MITUTOYO CORPORATION, Kanagawa (JP)

(72) Inventor: Koji Kubo, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 759 days.

(21) Appl. No.: 16/519,359

(22) Filed: Jul. 23, 2019

(65) Prior Publication Data

US 2020/0041757 A1 Feb. 6, 2020

(30) Foreign Application Priority Data

Aug. 3, 2018 (JP) .............................. JP2018-146605

(51) Int. Cl.
| | |
|---|---|
| *H04N 5/225* | (2006.01) |
| *H04N 5/232* | (2006.01) |
| *G02B 7/10* | (2021.01) |
| *H04N 5/235* | (2006.01) |
| *G02B 7/09* | (2021.01) |
| *G02F 1/29* | (2006.01) |

(52) U.S. Cl.
CPC ............... G02B 7/10 (2013.01); G02B 7/09 (2013.01); H04N 5/2256 (2013.01); H04N 5/2354 (2013.01); H04N 5/23212 (2013.01); *G02F 1/294* (2021.01)

(58) Field of Classification Search
CPC ............. H04N 5/2256; H04N 5/23212; H04N 5/2354; G02B 7/09; G02B 7/10
See application file for complete search history.

(56) References Cited

U.S. PATENT DOCUMENTS

| | | | |
|---|---|---|---|
| 2010/0177376 A1 | 7/2010 | Arnold et al. | |
| 2017/0320165 A1* | 11/2017 | Hyakumura | ......... B23K 26/046 |
| 2018/0314041 A1 | 11/2018 | Igasaki et al. | |

FOREIGN PATENT DOCUMENTS

| | | |
|---|---|---|
| JP | H11-23219 A | 1/1999 |
| JP | 2009-122105 A | 6/2009 |
| JP | 2018-189700 A | 11/2018 |

OTHER PUBLICATIONS

U.S. Appl. No. 16/527,486 to Koji Kubo, filed Jul. 31, 2019.

(Continued)

*Primary Examiner* — Daniel M Pasiewicz
(74) *Attorney, Agent, or Firm* — Greenblum & Bernstein, P.L.C.

(57) ABSTRACT

A variable focal length lens apparatus is provided with a variable focal length lens in which a focusing position periodically changes in response to a drive signal that is input; a light source that emits detection light at an object via the variable focal length lens; an photodetector that receives the detection light that is reflected by the object, and outputs a light detection signal; a signal processor that, based on the light detection signal that is input, outputs a light emission signal that is synchronized to a focusing time point where the detection light is focused on a surface of the object; an illuminator that provides pulse illumination to the object with illuminating light, based on the light emission signal that is input; and an image capturer that captures an image of the object through the variable focal length lens.

2 Claims, 10 Drawing Sheets

(56) References Cited

OTHER PUBLICATIONS

U.S. Appl. No. 16/549,323 to Shiro Igasaki et al., filed Aug. 23, 2019.
U.S. Appl. No. 16/414,148 to Hiroshi Sakai et al., filed May 16, 2019.
U.S. Appl. No. 16/556,546 to Shiro Igasaki et al., filed Aug. 30, 2019.
U.S. Appl. No. 16/519,117 to Koji Kubo et al., filed Jul. 23, 2019.

* cited by examiner

VARIABLE FOCAL LENGTH LENS APPARATUS

CROSS-REFERENCE TO RELATED APPLICATIONS

The present application claims priority under 35 U.S.C. § 119 of Japanese Application No. 2018-146605, filed on Aug. 3, 2018, the disclosure of which is expressly incorporated by reference herein in its entirety.

BACKGROUND OF THE INVENTION

1. Field of the Invention

The present invention relates to a variable focal length lens apparatus.

2. Description of Related Art

In recent years, variable focal length lenses that use a liquid lens system in which the refractive index changes periodically (hereafter referred to simply as a "lens system") have been developed (see, for example, the specification of U.S. Patent Application Publication No. 2010/0177376). The lens system is formed by immersing in a transparent fluid a hollow cylindrical vibrating member formed of a piezoelectric material. In the lens system, when AC voltage is applied to both an inner circumferential surface and an outer circumferential surface of the vibrating member, the vibrating member expands and contracts in a thickness direction and causes the fluid on an inner side of the vibrating member to vibrate. By adjusting a frequency of the applied voltage in response to the natural frequency of the fluid, a standing wave of concentric circles is formed in the fluid and concentric circular regions having different refractive indexes are formed centered on a center axis line of the vibrating member. Therefore, in the lens system, when light transits along the center axis line of the vibrating member, the light travels along a path that either disperses or converges the light in accordance with the refractive index of each concentric circular region.

The lens system described above and an objective lens for bringing the light into focus (for example, an ordinary convex lens or a group of lenses) are arranged on the same optical axis to configure a variable focal length lens. When parallel light strikes the ordinary objective lens, light passing through the lens comes into focus at a focal point position that lies at a predetermined focal length. In contrast, when parallel light strikes the variable focal length lens, the parallel light is either dispersed or converged by the lens system and the light passing through the objective lens comes into focus at a position that is offset either farther away or closer than the original (state with no lens system) focal point position.

In a variable focal length lens apparatus that incorporates the variable focal length lens, a drive signal (AC voltage of a frequency that generates a standing wave in the interior fluid) that is input to the lens system is applied, and by increasing or decreasing the amplitude of the drive signal, the focal point position of the variable focal length lens can be controlled as desired within a fixed range (a predetermined range where changes by the lens system are possible, with the focal point position of the objective lens as a reference).

In the variable focal length lens apparatus, a sinusoidal AC signal is used as an exemplary drive signal that is input to the lens system. When such a drive signal is input, the focal point position of the variable focal length lens apparatus changes sinusoidally. In this case, when the amplitude of the drive signal is 0, the light transiting the lens system is not refracted and the focal point position of the variable focal length lens coincides with the focal point position of the objective lens. When the amplitude of the drive signal is at a positive or negative peak, the light transiting the lens system is maximally refracted and the focal point position of the variable focal length lens apparatus is in a state having the greatest separation from the focal point position of the objective lens.

When an image of an objective is acquired using a variable focal length lens apparatus of this kind, a light emission signal that is synchronized to the phase of the sine wave of the drive signal is output and pulse illumination is provided. Accordingly, by providing pulse illumination in a state at a predetermined focal point position, from among the sinusoidally changing focal point positions, the image of the objective at the focal point position is detected. Pulse illumination is performed at a plurality of phases that are parts of one period, and when image detection is performed in accordance with each phase, images at a plurality of focal point positions can be obtained simultaneously.

In the variable focal length lens apparatus described above, by adjusting the timing of the pulse illumination, an image can be acquired of the moment where the focal point position coincides with a surface of the objective (focused image). However, the adjustment of the timing for the pulse illumination is performed manually, based on contrast information of the image, for example, and therefore requires a great deal of time and effort.

SUMMARY OF THE INVENTION

The present invention provides a variable focal length lens apparatus that is capable of acquiring a focused image simply.

A variable focal length lens apparatus according to one aspect of the present invention is provided with: a variable focal length lens in which a focusing position periodically changes in response to a drive signal that is input; a light source that emits detection light at an objective via the variable focal length lens; an photodetector that receives the detection light that is reflected by the objective, and outputs a light detection signal; a signal processor that, based on the light detection signal that is input, outputs a light emission signal that is synchronized to a focusing time point where the detection light is focused on a surface of the objective; an illuminator that provides pulse illumination to the objective with illuminating light, based on the light emission signal that is input; and an image capturer that captures an image of the objective through the variable focal length lens.

In the present invention, the focusing position for the variable focal length lens changes periodically in response to the drive signal that is input. Therefore, by traveling through the variable focal length lens, the detection light that is emitted from the light source is emitted at the objective while a condensing position in an optical axis direction is modified. The photodetector receives the detection light that is reflected by the objective and outputs the light detection signal. Based on the light detection signal that is input from the photodetector, the signal processor outputs the light emission signal that is synchronized to the focusing time point where the detection light is focused on the surface of the objective. A method of calculating the focusing time point based on the light detection signal may employ various focus detection methods, such as a confocal method, a double pinhole method, an astigmatic method, or a knife-edge method. For example, when employing a confocal method, the photodetector is arranged such that the light detection signal peaks when the focusing position for the variable focal length lens coincides with the surface of the objective. Thereby, the signal processor can detect the peak in the light detection signal as the focusing time point and can output the light emission signal that is synchronized to the focusing time point.

The illuminator emits the illuminating light at the objective based on the light emission signal that is input from the signal processor. In other words, the objective receives pulse illumination by the illuminating light, coordinated to the focusing time point. Therefore, the image capturer can acquire an image (focused image) of an occasion when the focusing position for the variable focal length lens coincides with the surface of the objective. As noted above, in the present invention, the timing of the pulse illumination for acquiring the focused image is adjusted automatically, and there is no need for manual adjustment as in the conventional art. Thus, a focused image of the objective can be acquired simply. Also, the pulse illumination according to the present invention refers to firing the illuminating light for an extremely short amount of time that is long enough for the image capturer to be able to acquire an image with no focal blur issues. The pulse illumination may be repeated by being matched to a drive period of the variable focal length lens, or may be performed one time independently.

In the variable focal length lens apparatus according to the present invention, preferably, the variable focal length lens is provided with: a liquid lens apparatus, in which the refractive index changes periodically in response to the drive signal that is input; an objective lens that is arranged on the same optical axis as the liquid lens apparatus; and a plurality of relay lenses that are arranged such that an exit pupil of the objective lens and a position of a principal point of the liquid lens apparatus are conjugate. In the present invention, even when the focusing position for the variable focal length lens fluctuates, the magnification power of the image that is incident on the image capturer is constant, and therefore favorable observation with no fluctuation in a field of view is possible.

A variable focal length lens apparatus according to another aspect of the present invention is provided with: a variable focal length lens in which a focusing position periodically changes in response to a drive signal that is input; a light source that emits light at an objective via the variable focal length lens; an optical guide that guides light which, after being reflected by the objective, passes through a position having a conjugate relationship with a focusing position for the variable focal length lens; an illumination optical system that emits the light guided by the optical guide at the objective; and an image capturer that captures an image of the objective through the variable focal length lens.

In the present invention, similar to the aspect described above, the focusing position for the variable focal length lens changes periodically in response to the drive signal that is input. Therefore, by traveling through the variable focal length lens, the light that is emitted from the light source is emitted at the objective while a condensing position in an optical axis direction is modified. In this case, the light that is reflected by the objective is condensed at a rear focal point position of the variable focal length lens and is incident on the optical guide only at the focusing time point where the light from the light source is focused on the surface of the objective. Also, the light that is guided by the optical guide is emitted at the objective via the illumination optical system. In other words, in the present invention, the light that is emitted from the light source and is reflected by the objective is emitted at the objective as return light only at the focusing time point. Therefore, the objective receives pulse illumination by the light, coordinated to the focusing time point. Accordingly, the image capturer can acquire an image (focused image) of an occasion when the focusing position coincides with the surface of the objective.

Accordingly, in the present invention, the timing of the pulse illumination for acquiring the focused image is adjusted automatically, and there is no need for manual adjustment as in the conventional art. Thus, a focused image of the objective can be acquired simply. Also, in the present invention, no illuminating light source or light emission signal processing apparatus is needed, and so costs can be cut.

In the variable focal length lens apparatus according to the present invention, the illumination optical system preferably includes a diffusion plate that diffuses the light that is emitted from the optical guide. In the present invention, a numerical aperture of the light that is emitted at the objective can be increased, and therefore a choice of illumination states can be increased.

In the variable focal length lens apparatus according to the present invention, preferably, the variable focal length lens is provided with: a liquid lens apparatus, in which the refractive index changes periodically in response to the drive signal; an objective lens that is arranged on the same optical axis as the liquid lens apparatus; and a plurality of relay lenses that are arranged such that an exit pupil of the objective lens and a position of a principal point of the liquid lens apparatus are conjugate. In the present invention, even when the focusing position for the variable focal length lens fluctuates, the magnification power of the image that is incident on the image capturer is constant, and therefore favorable observation with no fluctuation in a field of view is possible.

With the present invention, a variable focal length lens apparatus is provided that is capable of acquiring a focused image simply.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, various embodiments of the present invention are described with reference to the drawings.

First Embodiment

Figure 1:
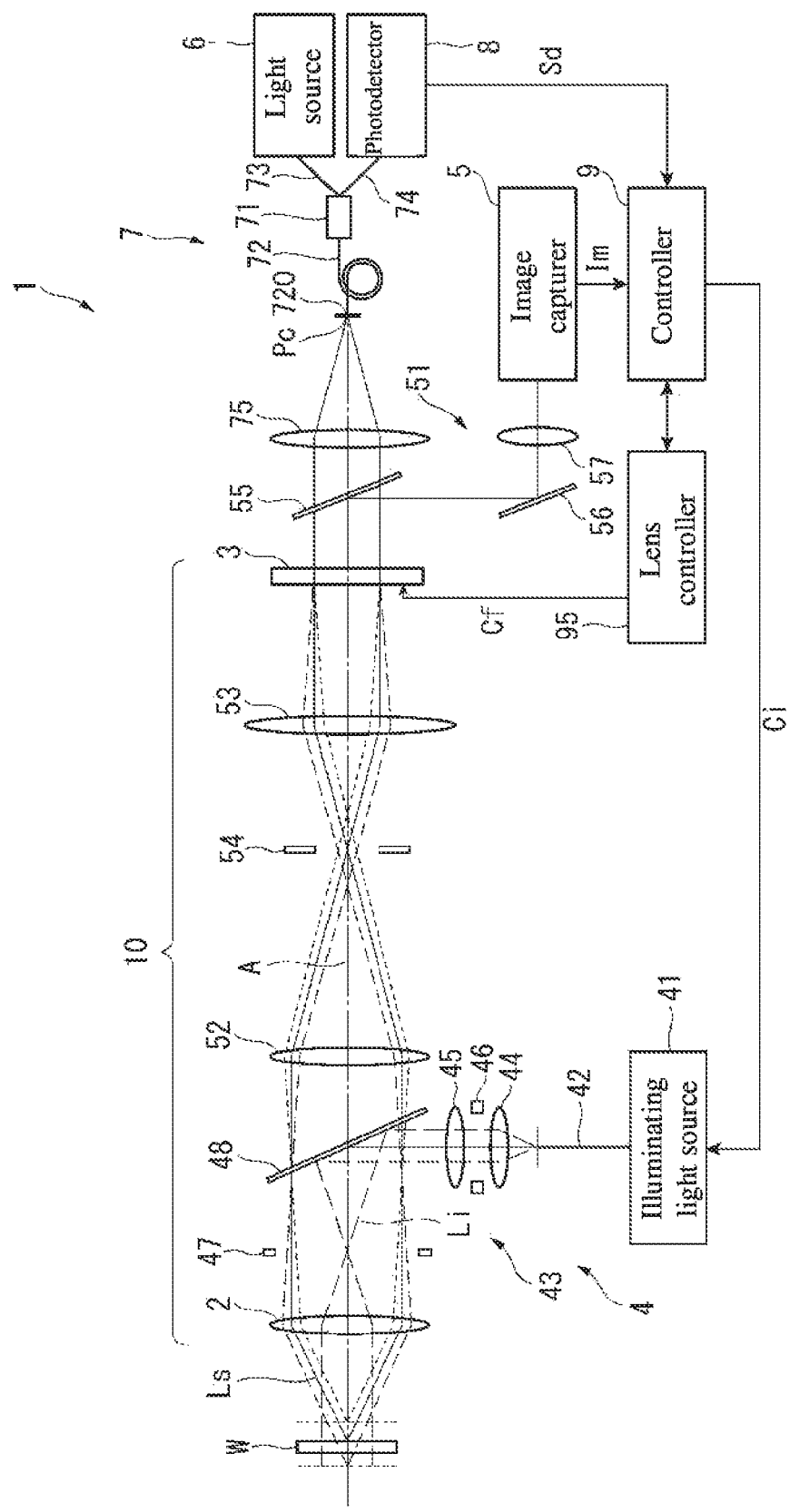
FIG. 1 is a schematic view illustrating a variable focal length lens apparatus according to a first embodiment of the present invention.

As illustrated in FIG. 1, a variable focal length lens apparatus 1 is configured to include a variable focal length lens 10 in which a focusing position changes periodically, and the variable focal length lens apparatus 1 acquires an image of an objective (object, measured object or measurable object) W that is arranged to intersect an optical axis A that runs through the variable focal length lens 10. Specifically, the variable focal length lens apparatus 1 is provided with a light source 6 that emits detection light; an optical system (optical guide 7 and collimating lens 75) that forms an optical path of the detection light; an objective lens 2 and liquid lens apparatus (liquid lens) 3 that configure the variable focal length lens 10; an photodetector 8 that receives the detection light reflected by the objective W; an illuminator 4 that provides pulse illumination to the objective W with illuminating light; and an image capturer (image sensor, imaging element) 5 that captures an image of the objective W through the variable focal length lens 10. Moreover, the variable focal length lens apparatus 1 is provided with a lens controller 95 that controls operation of the liquid lens apparatus 3, and a controller 9 for operating the lens controller 95. The controller 9 also includes functions to import and process a light detection signal Sd, and to output a light emission signal Ci to the illuminator 4.

Variable Focal Length Lens

As illustrated in FIG. 1, the variable focal length lens 10 is configured to include the objective lens 2 and the liquid lens apparatus 3. The objective lens 2 is configured by a known convex lens or a group of lenses. The objective lens 2 is arranged on the optical axis A, coaxially with the liquid lens apparatus 3. The liquid lens apparatus 3 is configured with a lens system on an interior thereof, and a refractive index of the liquid lens apparatus 3 changes in response to a drive signal Cf input from the lens controller 95. The drive signal Cf is a sinusoidal AC signal of a frequency that generates a standing wave in the liquid lens apparatus 3. A focusing position Pf of light that transits through the variable focal length lens 10 can be changed as desired by changing the refractive index of the liquid lens apparatus 3 with the focal length of the objective lens 2 as a reference.

Figure 2:
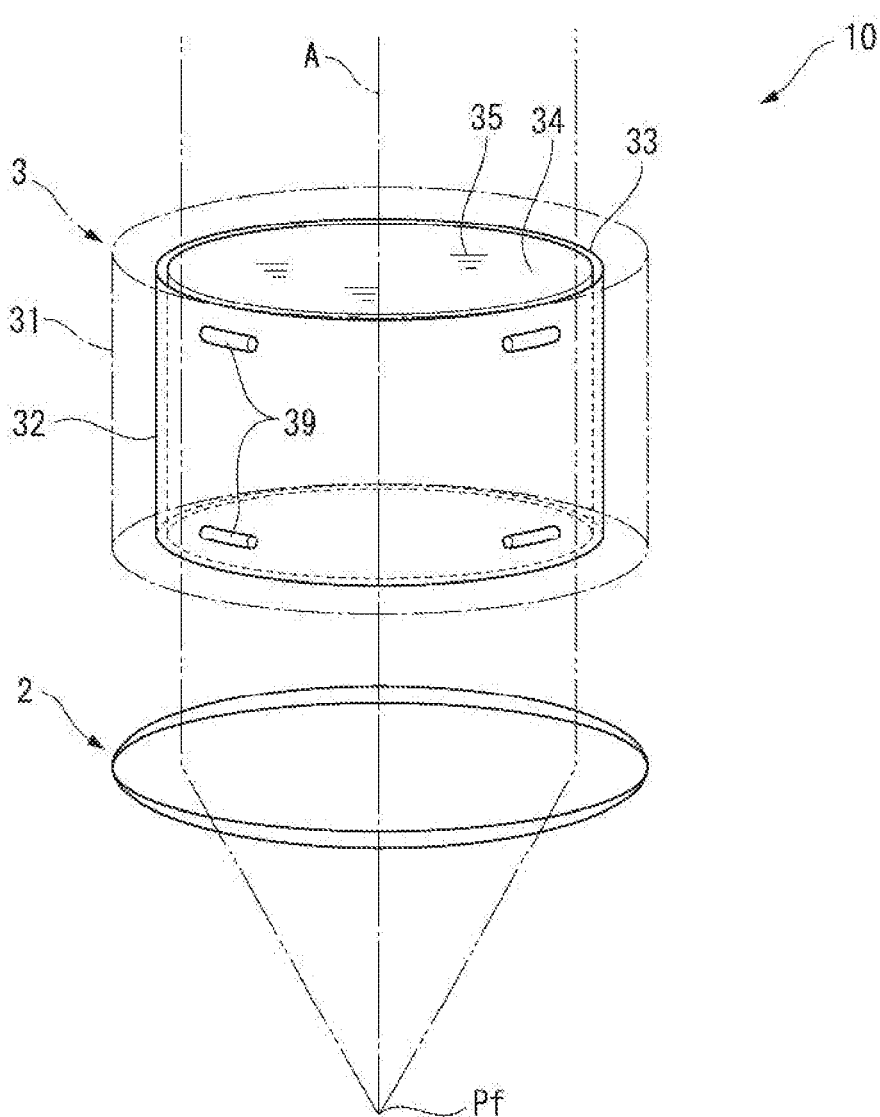
FIG. 2 is a schematic view illustrating a configuration of a liquid lens apparatus according to the first embodiment.
Figure 3:
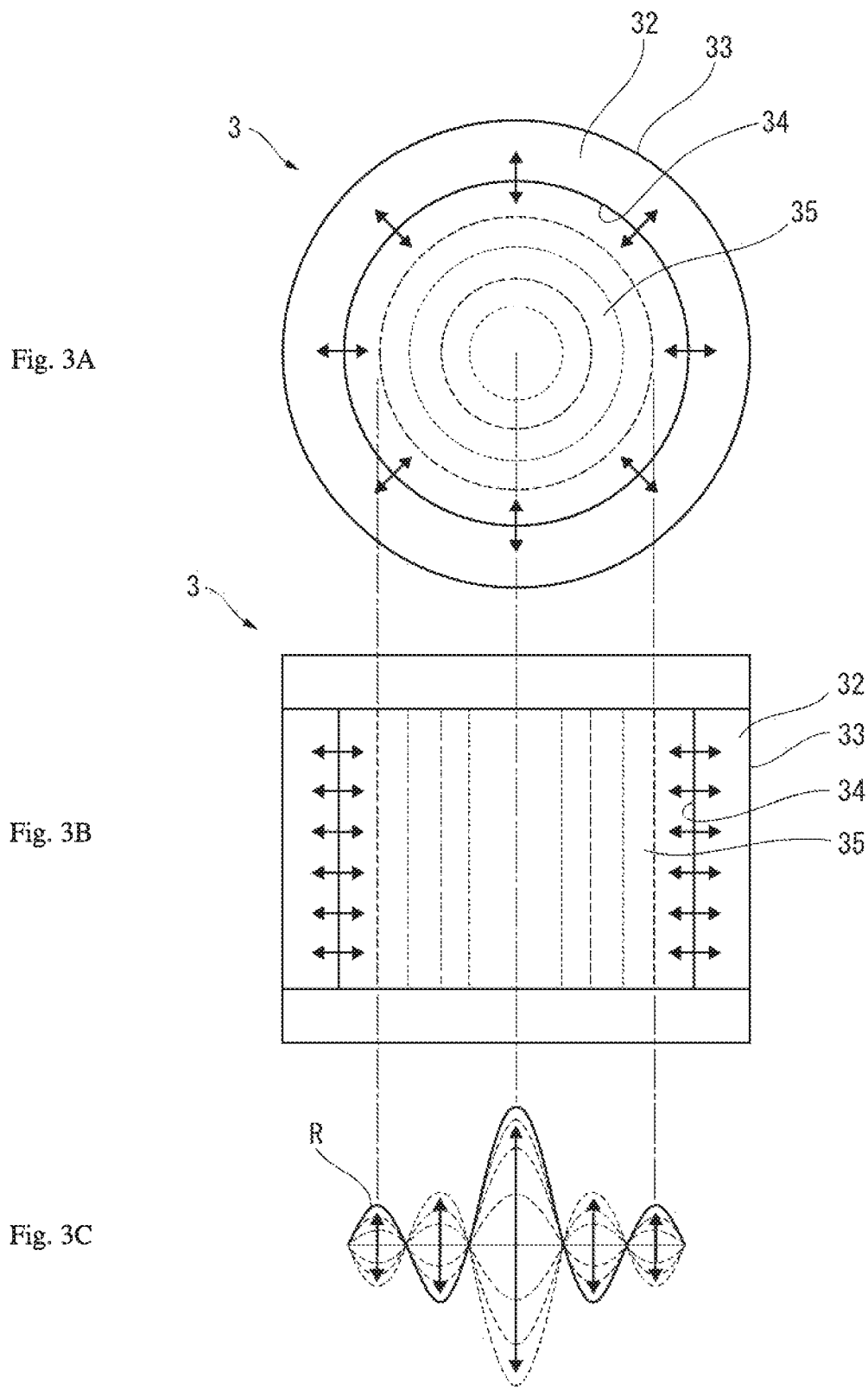
FIGS. 3A to 3C are schematic views illustrating oscillation states of the liquid lens apparatus according to the first embodiment.
Figure 4:
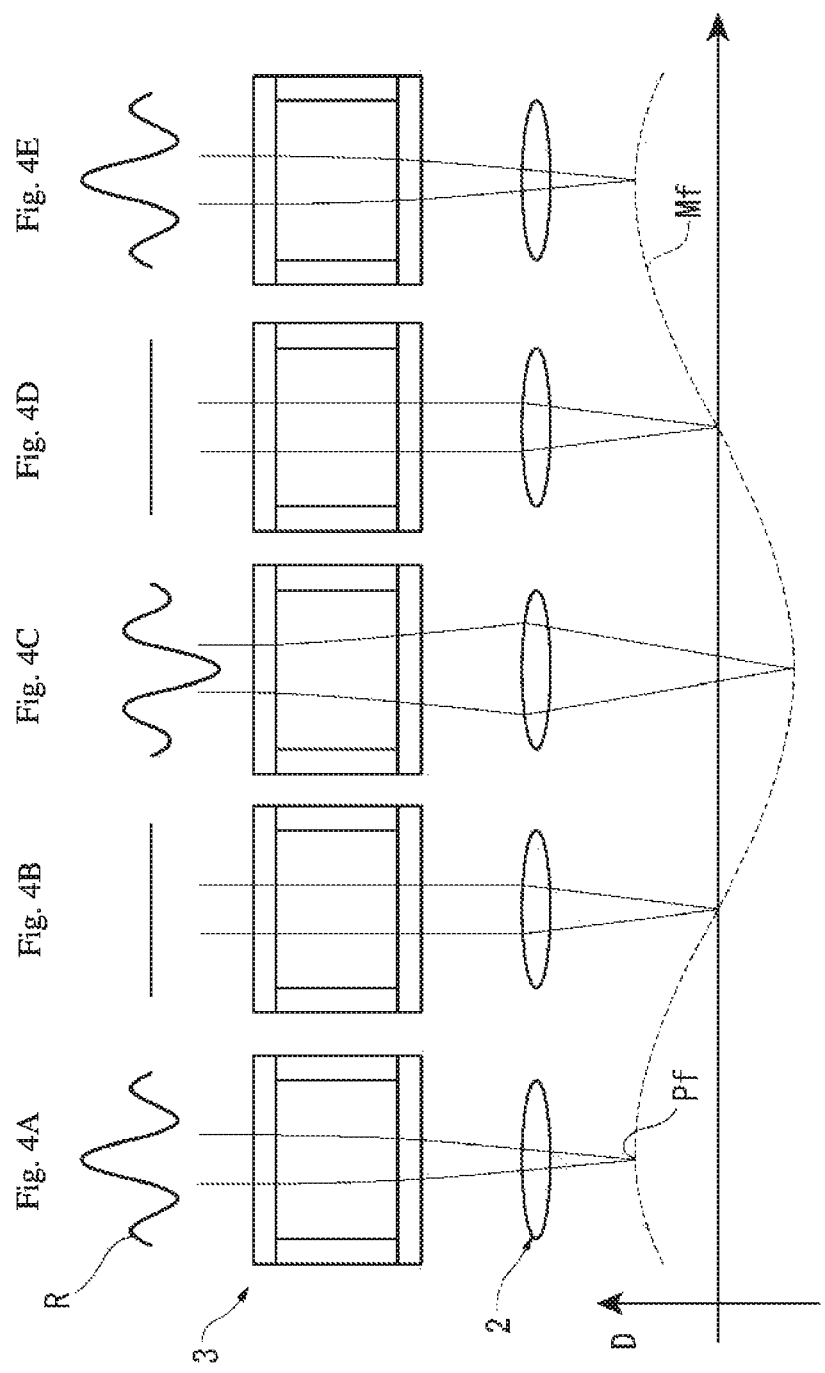
FIGS. 4A to 4E are schematic views illustrating focusing positions for the liquid lens apparatus according to the first embodiment.

FIGS. 2 to 4E describe a basic configuration of the variable focal length lens 10, but omit any depiction of relay lenses 52 and 53, for example, from the variable focal length lens 10. The relay lenses 52 and 53 perform relay for an exit pupil of the objective lens 2. In FIG. 2, the liquid lens apparatus 3 includes a hollow cylindrical case 31, and a hollow cylindrical oscillating member 32 is installed on an interior of the case 31. The oscillating member 32 is supported by spacers 39 made of an elastomer that are disposed between an outer circumferential surface 33 of the oscillating member 32 and an inner circumferential surface of the case 31. The oscillating member 32 is a member where a piezoelectric material is formed in a hollow cylindrical shape. The oscillating member 32 oscillates in a thickness direction due to an AC voltage of the drive signal Cf being applied between the outer circumferential surface 33 and the inner circumferential surface 34. The interior of the case 31 is filled with a highly transparent liquid 35, the entire oscillating member 32 is immersed in the liquid 35, and an inner side of the hollow cylindrical oscillating member 32 is filled with the liquid 35. The AC voltage of the drive signal Cf is adjusted to a frequency that generates a standing wave in the liquid 35 on the inner side of the oscillating member 32.

As shown in FIGS. 3A to 3C, in the liquid lens apparatus 3, when the oscillating member 32 is oscillated, a standing wave arises in the interior liquid 35 and concentric circular regions arise where the refractive index alternates (see FIGS. 3A and 3B). At this point, a relationship between a distance from a center axis line of the liquid lens apparatus 3 (radius) and the refractive index of the liquid 35 is as shown by a refractive index distribution R illustrated in FIG. 3C.

In FIGS. 4A to 4E, because the drive signal Cf is a sinusoidal AC signal, bands in the refractive index distribution R of the liquid 35 in the liquid lens apparatus 3 also change in accordance with the drive signal Cf. Also, the refractive index of the concentric circular regions that arise in the liquid 35 changes sinusoidally, and accordingly the focusing position Pf changes sinusoidally. FIGS. 4A to 4E illustrate a distance D from a focal point position of the objective lens 2 to the focusing position Pf. In the state depicted in FIG. 4A, an amplitude of the refractive index distribution R is at its largest, the liquid lens apparatus 3 causes transiting light to converge, and the focusing position Pf is at its closest to the objective lens 2. In the state depicted in FIG. 4B, the refractive index distribution R is flat, the liquid lens apparatus 3 allows transiting light to transit unaffected, and the focusing position Pf is at a standard value. In the state depicted in FIG. 4C, the amplitude of the refractive index distribution R is at its largest at the opposite pole from that of FIG. 4A, the liquid lens apparatus 3 causes transiting light to diffuse, and the focusing position Pf is at its farthest from the objective lens 2. In the state depicted in FIG. 4D, once again the refractive index distribution R is flat, the liquid lens apparatus 3 allows transiting light to transit unaffected, and the focusing position Pf is at the standard value. The state depicted in FIG. 4E returns once again to the state depicted in FIG. 4A and similar fluctuations are repeated thereafter. In this way, in the variable focal length lens 10, the drive signal Cf is a sinusoidal AC signal, and the focusing position Pf also fluctuates sinusoidally, as in a focal point fluctuation waveform Mf in FIGS. 4A to 4E. There may also be cases where, in the variable focal length lens 10, a principal point of the variable focal length lens 10 fluctuates, whereby the focal length (distance from the principal point of the variable focal length lens 10 to the focusing position Pf) remains constant while the focusing position Pf changes.

Also, as illustrated in FIG. 1, the variable focal length lens 10 includes not only the objective lens 2 and the liquid lens apparatus 3 described above, but also the relay lenses 52 and 53 and a diaphragm 54. The relay lenses 52 and 53 are arranged between the objective lens 2 and the liquid lens apparatus 3 such that the exit pupil of the objective lens 2 and the position of the principal point of the liquid lens apparatus 3 are conjugate, and the diaphragm 54 is arranged between the relay lenses 52 and 53. The relay lenses 52 and 53 and the diaphragm 54 perform relay for the exit pupil of the objective lens 2 while preserving a telecentric optical system, and therefore even when the focusing position Pf for the variable focal length lens 10 varies, the magnification of an image that is incident on the image capturer 5 is constant.

Image Capture Optical System

A description of an image capture optical system that performs image capture in the variable focal length lens apparatus 1 is given with reference to FIG. 1. The illuminator 4 provides pulse illumination to the objective W with illuminating light Li, and includes an illuminating light source 41 that emits the illuminating light Li, a light guide 42 that guides the illuminating light Li emitted from the illuminating light source 41, and an illumination optical system 43 that calibrates the illuminating light Li emitted from the light guide 42 and causes the illuminating light Li to be incident on the objective lens 2. The illuminating light source 41 is configured to include a light emitting element such as an LED, and emits the illuminating light Li based on the pulse-like light emission signal Ci that is input. Specifically, the illuminating light source 41 emits the illuminating light Li only while the light emission signal Ci is at a high level, and suspends emission of the illuminating light Li while the light emission signal Ci is at a low level. The light guide 42 is configured by an optical fiber or the like, and is connected to the illuminating light source 41. The light guide 42 transmits the illuminating light Li that is emitted from the illuminating light source 41 to the illumination optical system 43.

The illumination optical system 43 includes a collector lens 44, a condenser lens 45, a field diaphragm 46, and an aperture diaphragm 47. The illuminating light Li that has propagated from the light guide 42 is calibrated as appropriate and strikes the objective lens 2. In addition, the illumination optical system 43 includes a beam splitter 48 that is arranged between the objective lens 2 and the relay lens 52, which is described below. The beam splitter 48 reflects the illuminating light Li that is incident from the condenser lens 45 side, reflecting the illuminating light Li toward the objective lens 2 side. The illuminating light Li that is reflected by the beam splitter 48 bombards the objective W via the objective lens 2. Furthermore, the beam splitter 48 allows light that is incident from the relay lens 52 side (detection light Ls, described below) to pass through to the objective lens 2 side, and also allows light that is reflected by the objective W and is incident from the objective lens 2 side (illuminating light Li, detection light Ls) to pass through to the relay lens 52 side.

An image capture optical system 51 is provided with a beam splitter 55, a reflecting plate 56, and an imaging lens 57. The beam splitter 55 is arranged between the variable focal length lens 10 and the collimating lens 75. The beam splitter 55 splits the light that is incident from the variable focal length lens 10 side (light that includes the illuminating light Li and the detection light Ls), reflects a first light beam toward the reflecting plate 56 side, and also allows a second light beam to pass through to the collimating lens 75 side. In addition, the beam splitter 55 allows light that is incident from the collimating lens 75 side (the detection light Ls) to pass through to the variable focal length lens 10 side. The first light beam that is reflected by the beam splitter 55 is reflected by the reflecting plate 56, after which an image is resolved on the image capturer 5 by the imaging lens 57.

The image capturer 5 is configured by a known charge coupled device (CCD) image sensor or the like. The image capturer 5 captures an image of the objective W through the variable focal length lens 10, and outputs a captured image Im to the controller 9 in a predetermined signal form.

Detection Optical System

Next, a detection optical system that acquires the light detection signal Sd in the variable focal length lens apparatus 1 is described. The light source 6 is a laser light source, for example, and continuously emits the detection light Ls, which has a different wavelength from the illuminating light Li. The optical guide 7 includes a fiber splitter 71 and optical fibers 72 to 74. The fiber splitter 71 has an optical path where a first end portion of each of the optical fibers 72 to 74 are connected, and is configured so as to guide the light that is incident from the optical fiber 73 to the optical fiber 72, and guide the light that is incident from the optical fiber 72 to the optical fiber 74.

A second end portion of the optical fiber 73 is connected to the light source 6. Therefore, the detection light Ls that is emitted from the light source 6 passes through the optical fiber 73, the fiber splitter 71, and the optical fiber 72, and is emitted from an end face 720 of the optical fiber 72. In this example, the end face 720 of the optical fiber 72 carries out operations as a point light source. In addition, the second end portion of the optical fiber 74 is connected to the photodetector 8. Therefore, the detection light Ls that is incident on the end face 720 of the optical fiber 72 passes through the optical fiber 72, the fiber splitter 71, and the optical fiber 74, and is incident on the photodetector 8. In this example, the end face 720 of the optical fiber 72 is arranged at a rear focal point position Pc of the collimating lens 75. In other words, the end face 720 of the optical fiber 72 is arranged at a position that creates a conjugate relationship with respect to the focusing position Pf for the variable focal length lens 10.

The collimating lens 75 is arranged on the optical axis A, between the end face 720 of the optical fiber 72 and the variable focal length lens 10. The collimating lens 75 converts the detection light Ls that is emitted from the end face 720 of the optical fiber 72 into parallel light, and causes the parallel light to be incident on the variable focal length lens 10. In addition, the collimating lens 75 collects the detection light Ls that has reflected off the objective W and once again transited through the variable focal length lens 10.

The photodetector 8 may be a photomultiplier tube or a photodiode, for example, and is connected to the second end portion of the optical fiber 74. The photodetector 8 receives the detection light Ls that is incident via the optical fiber 74, and outputs the light detection signal Sd that corresponds to the strength of the light received.

In the configuration above, the detection light Ls emitted from the light source 6 travels through the optical guide 7 and is emitted from the end face 720 of the optical fiber 72, after which the detection light Ls is collimated along the optical axis A by the collimating lens 75 and is emitted at the objective W via the variable focal length lens 10. The detection light Ls that is reflected off a surface of the objective W once again transits through the variable focal length lens 10, after which the light is collected by the collimating lens 75. In this example, the focusing position Pf for the variable focal length lens 10 periodically changes in an optical axis A direction. Therefore, only when the focusing position Pf coincides with the surface of the objective W does the detection light Ls that is reflected off that surface form a spot at the rear focal point position Pc of the collimating lens 75, and the reflected detection light Ls is incident on the end face 720 of the optical fiber 72. Accordingly, the detection light Ls that is incident on the photodetector 8 is maximized when the focusing position Pf coincides with the surface of the objective W. In other words, the light detection signal Sd output by the photodetector 8 exhibits a peak when the focusing position Pf coincides with the surface of the objective W.

Controller

Figure 5:
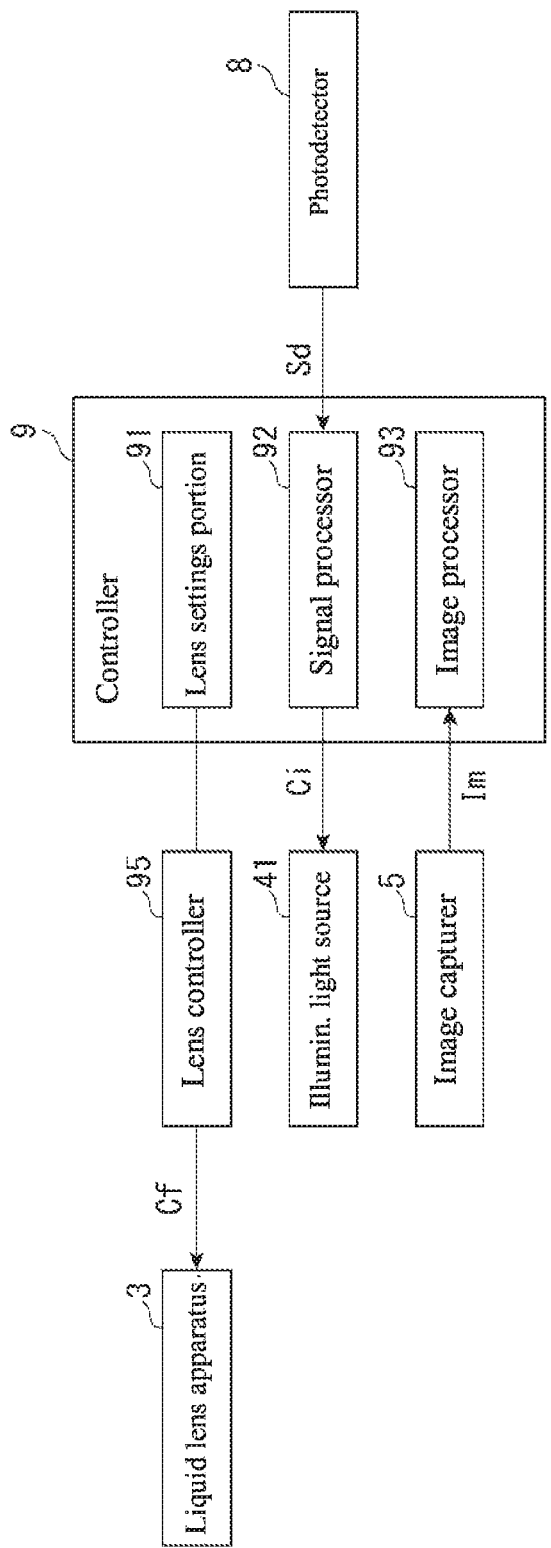
FIG. 5 is a block diagram schematically illustrating a configuration of control components according to the first embodiment.

As illustrated in FIG. 5, the controller 9 is configured by a personal computer or the like having a central processing unit (CPU) and a memory, for example. The controller 9 achieves expected functionality by running predetermined software, and includes a lens settings portion 91 that defines settings of the lens controller 95, a signal processor 92 that processes various input signals, and an image processor 93. The lens settings portion 91 defines settings for the frequency, amplitude, and maximum drive voltage of the drive signal Cf, for example, with respect to the lens controller 95. In the liquid lens apparatus 3, a number of changes in resonance may be changed according to a change in ambient temperature, for example. Therefore, the lens settings portion 91 executes operations to change the frequency of the drive signal CF in real-time through feedback control and stabilize the liquid lens apparatus 3.

The signal processor 92 outputs a light emission signal Ci to the illuminating light source 41 based on the light detection signal Sd that is input. The image processor 93 imports the image Im from the image capturer 5 and performs predetermined processing. The lens controller 95 controls operation of the liquid lens apparatus 3 by outputting the drive signal Cf to the liquid lens apparatus 3.

Pulse Illumination

Figure 6:
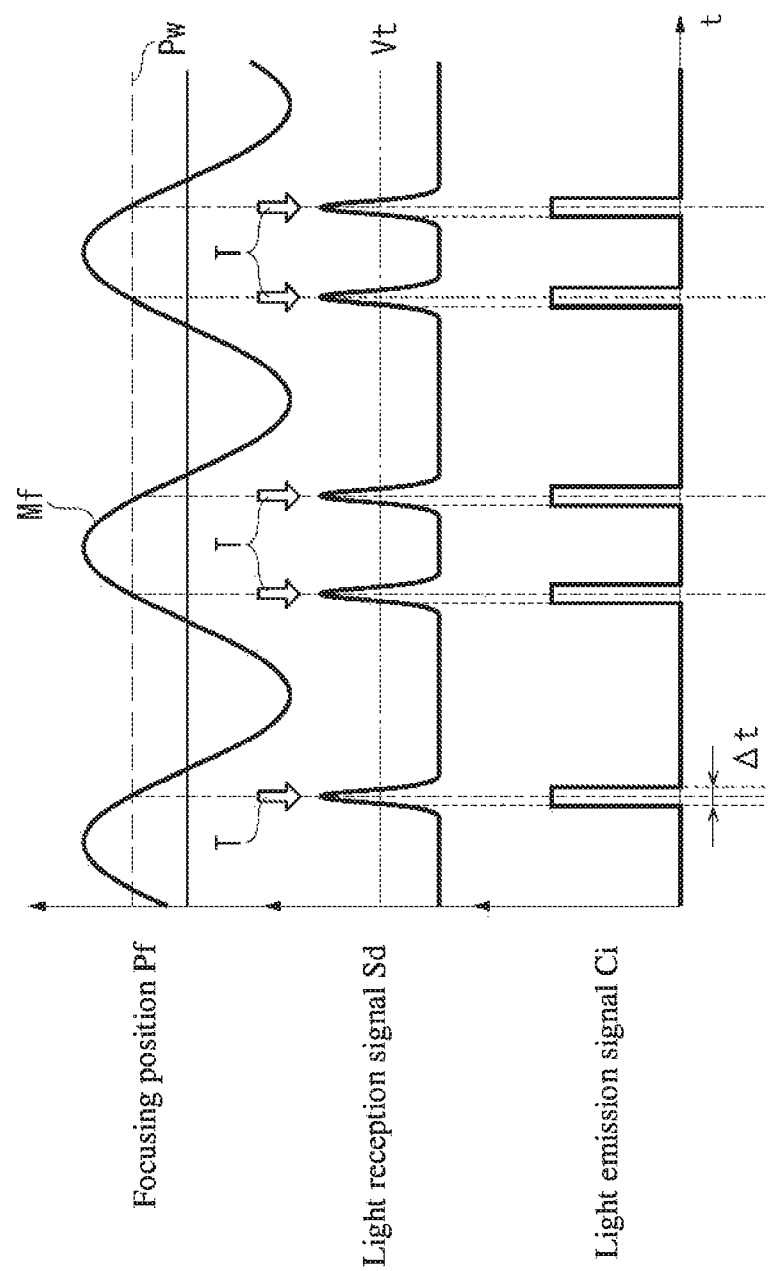
FIG. 6 is a graph illustrating the focusing position, a light detection signal, and a light emission signal according to the first embodiment.

Next, a method of pulse illumination according to the present embodiment is described. After beginning operations of the variable focal length lens 10, the signal processor 92 acquires the light detection signal Sd illustrated in FIG. 6. In FIG. 6, the focusing position Pf for the variable focal length lens 10 periodically changes in sync with the drive signal Cf. A position on the surface of the objective W (objective position Pw) in a range of the changes in the focusing position Pf on the optical axis A is given as an example in FIG. 6. The light detection signal Sd exhibits a peak at a time point where the focusing position Pf coincides with the objective position Pw (focusing time point T), and exhibits two peaks per one period of the drive signal Cf.

As illustrated in FIG. 6, the signal processor 92 sets the light emission signal Ci to a high level at a time point where the light detection signal Sd becomes equal to or greater than a threshold value Vt, and after a predetermined amount of time Δt has elapsed, switches the light emission signal Ci to a low level. Also, the signal processor 92 keeps the light emission signal Ci at a low level during a period where the value of the light detection signal Sd is below the threshold value Vt.

The illuminating light source 41 continues firing the illuminating light Li during a period where the input light emission signal Ci is at a high level. In this example, the predetermined amount of time Δt during which the light emission signal Ci is kept at a high level is set to an extremely short amount of time that is long enough for the image capturer 5 to be able to acquire an image with no focal blur issues, and the illuminating light source 41 provides pulse illumination with the illuminating light Li. The threshold value Vt of the light detection signal Sd is not particularly limited, but may be set such that the period where the light emission signal Ci is at a high level (period where the illuminating light Li provides pulse illumination) and the peak of the light detection signal Sd (focusing time point T) overlap. Accordingly, the signal processor 92 can output to the illuminating light source 41 a light emission signal Ci that is synchronized to the focusing time point T.

Therefore, in the variable focal length lens apparatus 1, based on the light emission signal Ci, the illuminator 4 provides pulse illumination to the objective W with the illuminating light Li for an extremely short period of time that includes the focusing time point T. The illuminating light Li that is emitted at the objective W forms an image via the variable focal length lens 10, the imaging lens 57, and the like, and is incident on the image capturer 5. The image capturer 5 captures the image of the objective W formed by the illuminating light Li. Accordingly, the image capturer 5 can capture an image (focused image) of an occasion when the focusing position Pf coincides with the objective position Pw.

Besides the detection light Ls, light originating from the illuminating light Li may also be included in the light beam that is incident on the photodetector 8. Similarly, besides the illuminating light Li, light originating from the detection light Ls may also be included in the light beam that is incident on the image capturer 5. In the present embodiment, the wavelengths of the detection light Ls and the illuminating light Li differ, and a detection wavelength of the photodetector 8 and image capture wavelength of the image capturer 5 differ from each other. Therefore, an influence of light spots originating from the detection light Ls in the focused image can be inhibited. Also, the pulse illumination provided by the illuminator 4 should fire the illuminating light Li for an extremely short amount of time that is long enough for the image capturer 5 to be able to acquire an image with no focal blur issues. The pulse illumination may be matched to a drive period of a variable focal length lens and repeated at every focusing time point T, or may be performed one time independently, when desired.

Effects of the First Embodiment

As noted above, in the variable focal length lens apparatus 1 according to the present embodiment, based on the input light detection signal Sd, the signal processor 92 outputs the light emission signal Ci that is synchronized to the focusing time point T. Also, the illuminator 4 provides pulse illumination to the objective W with the illuminating light Li, based on the input light emission signal Ci. Therefore, the timing of the pulse illumination for acquiring the focused image is adjusted automatically, and there is no need for manual adjustment as in the conventional art. Thus, a focused image of the objective W can be acquired simply. In addition, the variable focal length lens apparatus 1 according to the present embodiment uses the illuminating light source 41 to configure the illuminator 4, and therefore a desired intensity of illuminating light can be achieved by adjusting the light intensity of the illuminating light source 41.

A comparative example to the present embodiment may be considered in which the light emission signal Ci is defined at a predetermined phase angle relative to the focal point fluctuation waveform Mf. However, when the amplitude or peak value of the focal point fluctuation waveform Mf in the liquid lens apparatus 3 changes due to some factor, a discrepancy may arise, before and after the change, in the focusing position Pf at the time of emitting the light emission signal Ci, necessitating correction to eliminate the discrepancy. In contrast, in the present embodiment, even when the amplitude or peak value of the focal point fluctuation waveform Mf changes, the light emission signal Ci is synchronized to the focusing time point T, which is a peak in the light detection signal Sd, and therefore the focusing position Pf at the time of pulse illumination is automatically adjusted to the objective position Pw even without performing a correction. Therefore, a focused image can always be acquired correctly without performing complicated processing.

In the present embodiment, the variable focal length lens 10 is provided with the plurality of relay lenses 52 and 53 between the objective lens 2 and the liquid lens apparatus 3. The relay lenses 52 and 53 are arranged such that the exit pupil of the objective lens 2 and the position of the principal point of the liquid lens apparatus 3 are conjugate, and the relay lenses 52 and 53 perform relay for the exit pupil of the objective lens 2 while preserving a telecentric optical system. Therefore, even when the focusing position Pf fluctuates, the magnification power of the image that is incident on the image capturer 5 is constant.

In the present embodiment, the focusing time point T is detected using a confocal method. Therefore, as compared to a case where the focusing time point T is detected using a different focus detection method, measurement accuracy in the present embodiment is less likely to be affected by surface textures such as inclination, roughness, or similar in the surface of the objective W, and the detection accuracy of the focusing time point T can be improved. In addition, the end face 720 of the optical fiber 72 fills the role of both a point light source and a detection pinhole in the confocal optical system, and therefore a calibration workload during manufacturing can be greatly reduced.

Modifications of the First Embodiment

In the first embodiment, the focusing time point T is detected using a confocal method, but the present invention is not limited to this. Specifically, the focusing time point T may also be detected using various other focus detection methods, such as a double pinhole method, an astigmatic method, or a knife-edge method. For example, in a case that uses the double pinhole method, photodetectors are respectively provided before and after a condensing position that has a conjugate relationship with the focusing position Pf, and calculations are performed based on light detection signals output from each of the photodetectors, whereby the focusing time point T can be found. The signal processor 92 may also output a light emission signal Ci that is synchronized to the focusing time point T found in this way.

Also, in the first embodiment, the signal processor 92 sets the light emission signal Ci to a high level, and after the predetermined amount of time Δt elapses, the signal processor 92 sets the light emission signal Ci to a low level. However, the present invention is not limited to this. For example, the signal processor 92 may also always set the light emission signal Ci to a low level during a period of time where the light detection signal Sd is below the threshold value Vt, and may set the light emission signal Ci to a high level only during a period of time where the light detection signal Sd is equal to or greater than the threshold value Vt.

In addition, in the first embodiment, when light spots originating from the detection light Ls in the focused image are not an issue, the wavelength ranges of the detection wavelength of the photodetector 8 and the image capture wavelength of the image capturer 5 may overlap.

Second Embodiment

Figure 7:
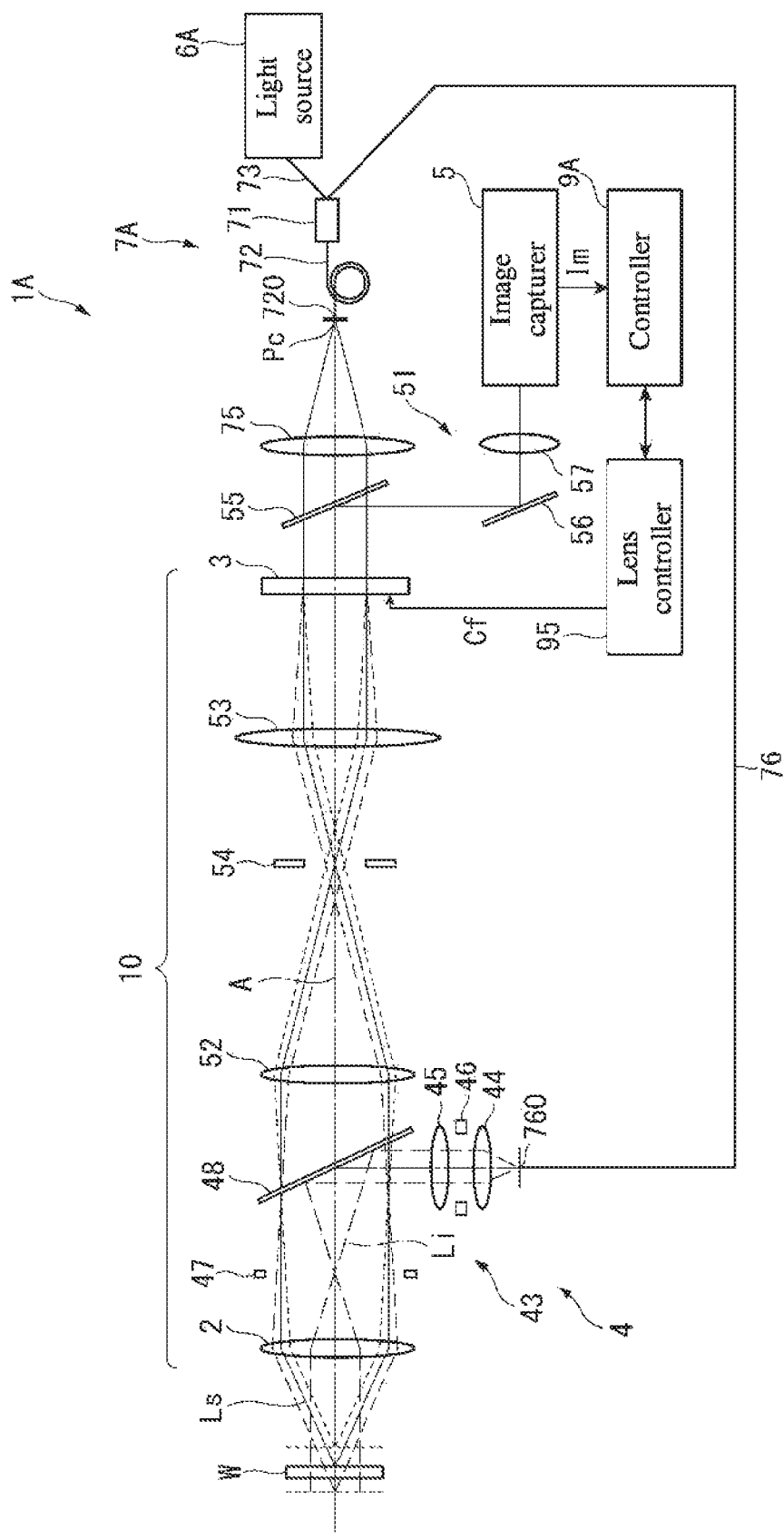
FIG. 7 is a schematic view illustrating a variable focal length lens apparatus according to a second embodiment of the present invention.

A variable focal length lens apparatus 1A according to a second embodiment is described with reference to FIG. 7. In the second embodiment, identical reference numerals are used for structures similar to those in the first embodiment and a detailed description thereof is omitted.

The variable focal length lens apparatus 1A according to the present embodiment is provided with a configuration that uses return light of the detection light Ls that is emitted from a light source 6A as the illuminating light Li. Therefore, the variable focal length lens apparatus 1A is not provided with the photodetector 8 of the first embodiment, and a controller 9A does not have the signal processor 92 of the first embodiment. The light source 6A continuously emits light of a wavelength that can be used as illuminating light to allow the image capturer 5 to capture an image of the objective W.

In addition, the variable focal length lens apparatus 1A includes an optical guide 7A that guides light which, after being reflected by the objective W, travels through the rear focal point position Pc of the collimating lens 75; and the illumination optical system 43, which emits the light guided by the optical guide 7A at the objective W. The optical guide 7A has a configuration different from that of the optical guide 7 according to the first embodiment. Instead of the optical fiber 74 that is connected to the photodetector 8 in the first embodiment, the optical guide 7A includes an optical fiber 76. The optical fiber 76 has a first end portion connected to the fiber splitter 71 and a second end portion arranged in the vicinity of the illumination optical system 43. The illumination optical system 43 has a configuration similar to that in the first embodiment, and appropriately calibrates the light that is emitted from the second end portion of the fiber splitter 71 and emits the light at the objective W as illuminating light Li, via the objective lens 2.

In the configuration above, the detection light Ls emitted from the light source 6A travels through the optical guide 7A and is emitted from the end face 720 of the optical fiber 72, after which the detection light Ls is collimated along the optical axis A by the collimating lens 75 and is emitted at the objective W via the variable focal length lens 10. The detection light Ls that is reflected off the surface of the objective W once again transits through the variable focal length lens 10, after which the light is collected by the collimating lens 75. In this example, the focusing position Pf for the variable focal length lens 10 periodically changes in an optical axis A direction. Therefore, only when the focusing position Pf coincides with the surface of the objective W does the detection light Ls that is reflected off that surface form a spot at the rear focal point position Pc of the collimating lens 75, and the reflected detection light Ls is incident on the end face 720 of the optical fiber 72. The detection light Ls that is incident on the end face 720 of the optical fiber 72 is emitted at the objective W as illuminating light Li, via the optical guide 7A and the illumination optical system 43. When the focusing position Pf coincides with the surface of the objective W, pulse illumination of the illuminating light Li is provided to the objective W.

Therefore, in the second embodiment also, similar to the first embodiment, the timing of the pulse illumination for acquiring the focused image is adjusted automatically, and there is no need for manual adjustment as in the conventional art. Thus, a focused image of the objective W can be acquired simply. Also, even when the amplitude or peak value of the focal point fluctuation waveform Mf changes, the detection light Ls becomes the illuminating light Li (as return light) only when the focusing position Pf coincides with the surface of the objective W, and therefore the focusing position Pf at the time of pulse illumination is automatically adjusted to the objective position Pw even without performing a correction. Therefore, a focused image can always be acquired correctly without performing complicated processing. Moreover, according to the second embodiment, costs can be cut to the extent that the illuminating light source 41 of the first embodiment is not used. Also, processing in the controller 9A is simplified to the extent that processing of the light emission signal Ci according to the first embodiment is not performed.

Modifications of the Second Embodiment

Figure 8:
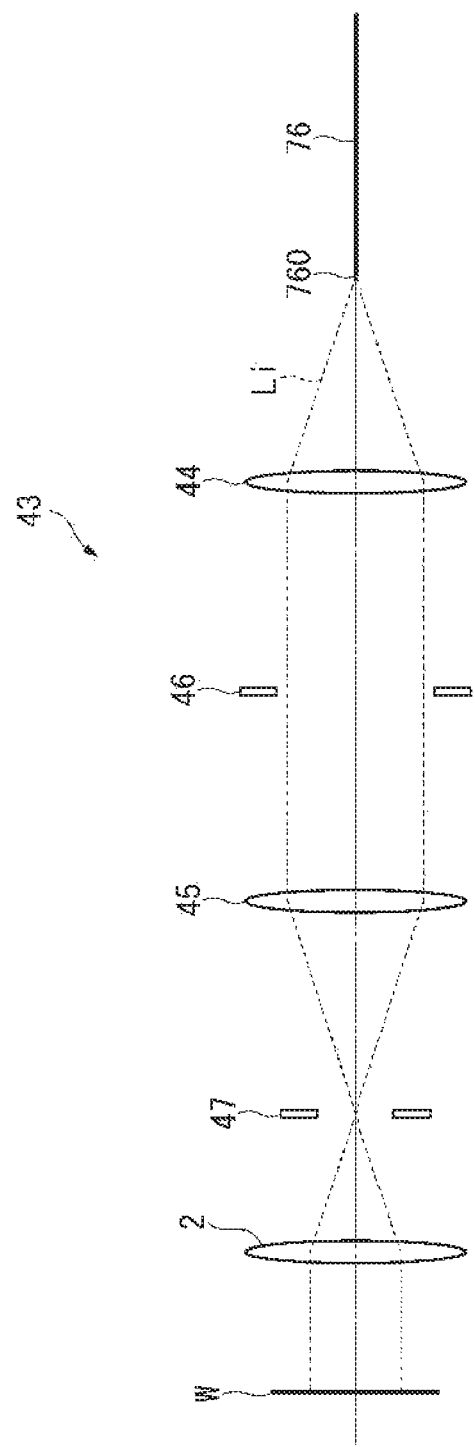
FIG. 8 is a schematic view illustrating an illumination optical system according to the second embodiment.

As illustrated in FIG. 8, in the illumination optical system 43 of the second embodiment, a core diameter of the optical fiber 76 (generally a diameter of 1 mm or less) is itself the size of the illuminating light Li, and therefore a numerical aperture NA of the illuminating light Li on the objective W is nearly zero. Therefore, in the second embodiment, only coherent illumination is achieved with the illuminating light Li. FIG. 8 omits the beam splitter 48 of the illumination optical system 43 and illustrates a state where the optical axis of the illuminating light Li is restored to a straight line.

Figure 9:
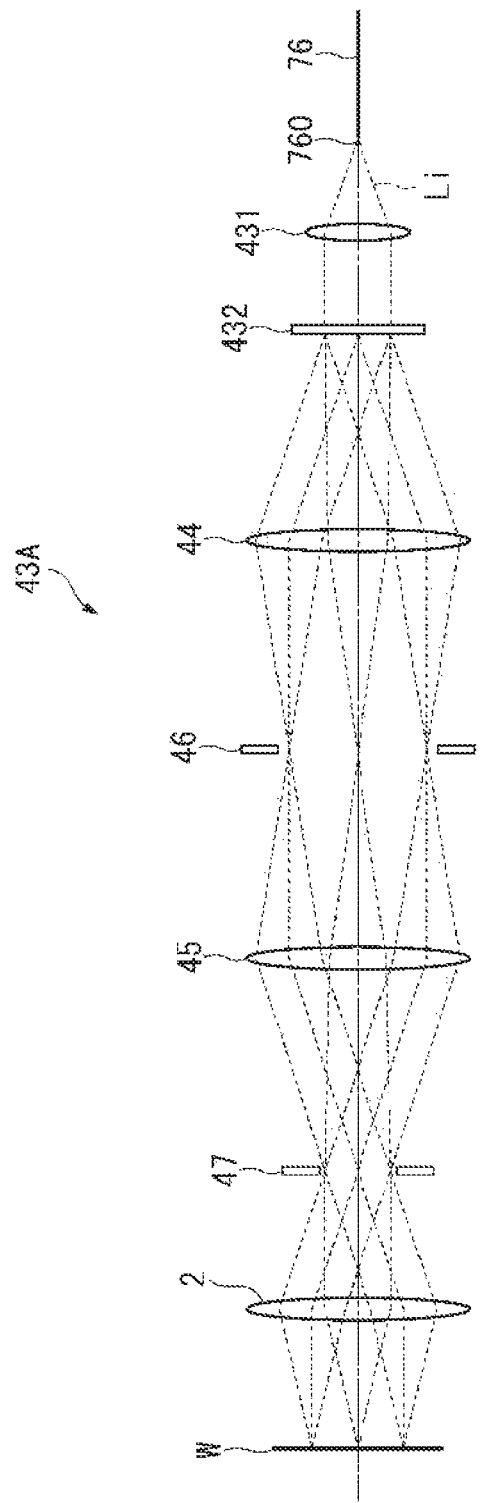
FIG. 9 is a schematic view illustrating an illumination optical system according to a modification of the second embodiment.
Figure 10:
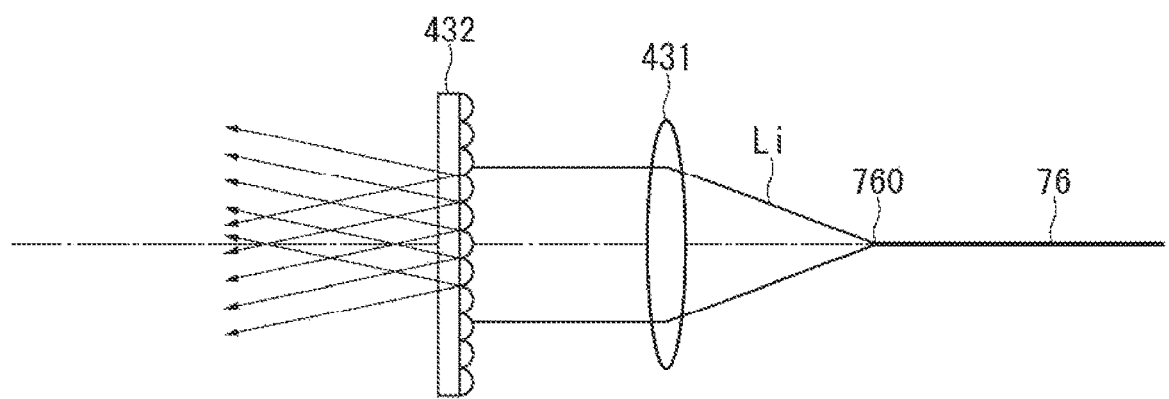
FIG. 10 is a schematic view illustrating a diffusion plate in the illumination optical system according to the modification of the second embodiment.

In this connection, as illustrated in FIG. 9 as a modification of the second embodiment, an illumination optical system 43A may be further provided with a collimating lens 431 and a diffusion plate 432 between an emitting end 760 of the optical fiber 76 and the collector lens 44. The diffusion plate 432 is a lens diffusion plate (see FIG. 10) provided with a lens array, for example, but may also be a diffusion plate achieved in a different form.

In this modification, the illuminating light Li emitted from the emitting end 760 of the optical fiber 76 is collimated by the collimating lens 431, after which the light is diffused by the diffusion plate 432. Thus, the size of the illuminating light Li emitted at the objective W is increased and the numerical aperture NA of the illuminating light Li on the objective W is increased. Accordingly, incoherent illumination or partially coherent illumination can be achieved, and a choice of illumination states is increased.

Additional Modifications

The present invention is not limited to the various embodiments described above, and includes modifications and improvements within a scope capable of achieving the advantages of the present invention.

In each of the embodiments described above, the drive signal Cf and the focal point fluctuation waveform Mf are sine waves. However, the drive signal Cf and the focal point fluctuation waveform Mf may instead be triangular waves, saw-tooth waves, rectangular waves, or some other waveform. The specific configuration of the liquid lens apparatus 3 may be modified as appropriate. Instead of having a hollow cylindrical shape, the case 31 and the vibrating member 32 may have a hollow hexagonal shape, for example. The dimensions of these components and the properties of the liquid 35 can also be selected as appropriate for the application.

In each of the above embodiments, a configuration may be adopted in which a pinhole is used instead of the optical guides 7 and 7A. Specifically, effects similar to those of each of the above embodiments can be achieved by using a pinhole that configures a point light source and a pinhole that is arranged at a rear focal point of the collimating lens 75. In particular, the optical guide 7A of the second embodiment is configured by combining such pinholes with an optical system such as a mirror, and thereby light that is reflected off the objective W and then passes through the rear focal point position Pc of the collimating lens 75 can be guided to the vicinity of the illumination optical system 43.

In each of the embodiments described above, the variable focal length lens 10, together with the collimating lens 75, configures an infinity-corrected optical system (optical system where parallel light from the collimating lens 75 is incident on the variable focal length lens 10), but the present invention is not limited to this. For example, the collimating lens 75 may be omitted and the variable focal length lens 10 may configure a finite correction optical system. Effects similar to those of the above-described embodiments are achieved with this configuration, as well.

In each of the above-described embodiments, the signal processor 92 is configured within the controller 9, but the signal processor 92 may also be configured within the lens controller 95. Moreover, the lens controller 95 and the controller 9 may be configured as an integrated control device.

The present invention can be used as a variable focal length lens apparatus that is capable of acquiring a focused image simply.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A variable focal length lens apparatus comprising:
a variable focal length lens in which a focusing position periodically changes in response to an input drive signal;
a light source which emits detection light at an object via the variable focal length lens;

an photodetector which receives the detection light that is reflected by the object, and which outputs a light detection signal;

a signal processor which receives the output light detection signal and which, based on the received light detection signal, outputs a light emission signal that is synchronized to a focusing time point where the detection light is focused on a surface of the object;

an illuminator which receives the output light emission signal and which provides pulse illumination to the object with illuminating light, based on the light emission signal; and an image sensor which captures an image of the object through the variable focal length lens.

2. The variable focal length lens apparatus according to claim 1, wherein the variable focal length lens comprises:

a liquid lens in which a refractive index periodically changes in response to an input drive signal;

an objective lens that is arranged on the same optical axis as the liquid lens; and a plurality of relay lenses that are arranged such that an exit pupil of the objective lens and a position of a principal point of the liquid lens are conjugate.

* * * * *